US008249063B2

(12) United States Patent
Duan et al.

(10) Patent No.: US 8,249,063 B2
(45) Date of Patent: Aug. 21, 2012

(54) METHOD AND APPARATUS FOR SIGNAL FORMATION WITH GUARANTEED CONSISTENT OVERHEAD INSERTION (75) Inventors: Cheng Gang Duan, Shanghai (CN); Lin Hua, Shanghai (CN); Ze Mian Huang, Shanghai (CN); Michael S. Shaffer, Lynnfield, MA (US); Tao Wang, Shanghai (CN)

(73) Assignee: LSI Corporation, Allentown, PA (US)

( * ) Notice: Subject to any disclaimer, the term of this patent is extended or adjusted under 35 U.S.C. 154(b) by 298 days.

(21) Appl. No.: 12/494,449

(22) Filed: Jun. 30, 2009

(65) Prior Publication Data
US 2010/0329673 A1 Dec. 30, 2010

(51) Int. Cl.
*H04L 12/50* (2006.01)
*H04Q 11/00* (2006.01)

(52) U.S. Cl. .......................... 370/371; 370/514; 370/539

(58) Field of Classification Search .................. 370/358, 370/465, 467–476, 506–514, 535–539, 226–242, 370/412, 371, 532, 533, 534, 540, 541; 714/703–713
See application file for complete search history.

(56) References Cited

U.S. PATENT DOCUMENTS

| 6,940,808 | B1 * | 9/2005 | Shields et al. | 370/216 |
| 7,039,072 | B1 * | 5/2006 | Shivji et al. | 370/537 |
| 7,180,913 | B2 * | 2/2007 | Benvenuti et al. | 370/476 |
| 7,826,480 | B1 * | 11/2010 | Sethuram et al. | 370/466 |
| 2004/0008708 | A1 * | 1/2004 | Giacomini | 370/412 |
| 2004/0165618 | A1 * | 8/2004 | Sugawara et al. | 370/535 |
| 2006/0067314 | A1 * | 3/2006 | Ho et al. | 370/389 |
| 2007/0189155 | A1 * | 8/2007 | Shioda et al. | 370/219 |

OTHER PUBLICATIONS

U.S. Appl. No. 11/839,971 filed in the name of C.G. Duan et al. Aug. 16, 2007 and entitled "Synchronous Transport Signal Mapper with Payload Extraction and Insertion Functionality."
U.S. Appl. No. 11/935,533 filed in the name of C.G. Duan et al. Nov. 6, 2007 and entitled "In-Band Communication of Alarm Status Information in a Synchronous Transport Communication System."
Agere Systems, "TMXF84622 Ultramapper 622/155 Mbits/s SONET SDX x DS3/E3/DS2/DS1/E1/DS0," Ultramapper Resource Document, Jun. 6, 2002, pp. 1-250.

* cited by examiner

*Primary Examiner* — Chuong T Ho
(74) *Attorney, Agent, or Firm* — Ryan, Mason & Lewis, LLP (57) ABSTRACT A communication device comprises a signal combiner, first storage elements, second storage elements and a controller. The signal combiner is configured to combine overhead information with additional information in forming a frame of a signal. The first storage elements are adapted to receive respective portions of a given block of the overhead information to be applied to the signal combiner, and the second storage elements are coupled between respective ones of the first storage elements and respective inputs of the signal combiner. The controller is operative to monitor a count of portions of the frame as the frame is formed by the signal combiner and to control loading of the portions of the given block of the overhead information into the second storage elements from the first storage elements responsive to the monitored count. The disclosed techniques for guaranteed consistent overhead insertion can be implemented in any type of communication system which utilizes overhead insertion in its framing operations.

21 Claims, 3 Drawing Sheets

METHOD AND APPARATUS FOR SIGNAL FORMATION WITH GUARANTEED CONSISTENT OVERHEAD INSERTION

FIELD OF THE INVENTION

The present invention relates generally to network-based communication systems, and more particularly to communication devices which process overhead information in such communication systems.

BACKGROUND OF THE INVENTION

Conventional network-based communication systems include systems configured to operate in accordance with well-known synchronous transport standards, such as the synchronous optical network (SONET) and synchronous digital hierarchy (SDH) standards.

The SONET standard was developed by the Exchange Carriers Standards Association (ECSA) for the American National Standards Institute (ANSI), and is described in the document ANSI T1.105-1988, entitled "American National Standard for Telecommunications-Digital Hierarchy Optical Interface Rates and Formats Specification" (September 1988), which is incorporated by reference herein. SDH is a corresponding standard developed by the International Telecommunication Union (ITU), set forth in ITU standards documents G.707 and G.708, which are incorporated by reference herein.

The basic unit of transmission in the SONET standard is referred to as a synchronous transport signal level-1 (STS-1). It has a serial transmission rate of 51.84 Megabits per second (Mbps).

Synchronous transport signals at higher levels may be concatenated or channelized. For example, an intermediate unit of transmission in the SONET standard is referred to as synchronous transport signal level-3, concatenated (STS-3c). It has a serial transmission rate of 155.52 Mbps. The corresponding unit in the SDH standard is referred to as STM-1. In a concatenated synchronous transport signal, the entire payload is available as a single channel. A channelized signal, by way of contrast, is divided into multiple channels each having a fixed rate. For example, the channelized counterpart to the concatenated STS-3c signal is denoted STS-3. STS-3 is a channelized signal that comprises three separate STS-1 signals each at 51.84 Mbps.

A given STS-3c or STM-1 signal is organized in frames having a duration of 125 microseconds, each of which may be viewed as comprising nine rows by 270 columns of bytes, for a total frame capacity of 2,430 bytes per frame. The first nine bytes of each row comprise transport overhead (TOH), while the remaining 261 bytes of each row are referred to as a synchronous payload envelope (SPE). Synchronous transport via SONET or SDH generally involves a hierarchical arrangement in which an end-to-end path may comprise multiple lines with each line comprising multiple sections. The TOH includes section overhead (SOH), pointer information, and line overhead (LOH). The SPE includes path overhead (POH). Additional details regarding signal and frame formats can be found in the above-cited documents.

In conventional SONET or SDH network-based communication systems, synchronous transport signals like STS-3c or STM-1 are mapped to or from corresponding higher-rate optical signals such as a SONET OC-12 signal or an SDH STM-4 signal. An OC-12 optical signal carries four STS-3c signals, and thus has a rate of 622.08 Mbps. The SDH counterpart to the OC-12 signal is the STM-4 signal, which carries four STM-1 signals, and thus also has a rate of 622.08 Mbps. The mapping of these and other synchronous transport signals to or from higher-rate optical signals generally occurs in a physical layer device commonly referred to as a mapper, which may be used to implement an add-drop multiplexer (ADM) or other node of a SONET or SDH communication system.

Such a mapper typically interacts with a link layer processor. A link layer processor is one example of what is more generally referred to herein as a link layer device, where the term "link layer" generally denotes a switching function layer. Another example of a link layer device is a field programmable gate array (FPGA). These and other link layer devices can be used to implement processing associated with various packet-based protocols, such as Internet Protocol (IP) and Asynchronous Transfer Mode (ATM), as well as other protocols, such as Fiber Distributed Data Interface (FDDI). A given mapper or link layer device is often implemented in the form of an integrated circuit.

In SONET/SDH mapper applications, overhead information such as the above-noted TOH information may be used for network control, status reports, and other functions. It is typical for only a single byte of such information to be used for a given instance of such a function. One reason for this is that it may be difficult under certain circumstances to ensure that multiple consecutive bytes of the overhead information are inserted in a consistent manner within a given frame. For example, if the TOH bytes are inserted under the control of a host processor that operates with a different clock frequency or phase than that of the mapper, a consistent sequencing of multiple TOH bytes in the given frame is not guaranteed. That is, multiple TOH bytes that would need to be in a particular order so as to provide a desired function are not guaranteed to be inserted in that particular order within the given frame.

Accordingly, a need exists for an improved approach to insertion of TOH bytes or other overhead information in forming a synchronous transport signal or other type of signal.

SUMMARY OF THE INVENTION

Illustrative embodiments of the present invention overcome the above-noted drawbacks of conventional practice by providing synchronous transport signal mappers or other communication devices that are configured to perform TOH byte insertion in a manner that provides guaranteed consistency between multiple TOH bytes of an extended TOH word to be inserted within a given frame of a synchronous transport signal.

Although particularly useful for TOH byte insertion in synchronous transport signals, these and other illustrative embodiments of the present invention can be adapted in a straightforward manner for use with a wide variety of other types of signals, including signals comprising packet data, or asynchronous signals. More generally, the techniques disclosed herein can be applied to any type of signal structure that includes overhead information that must be inserted in a consistent manner. Thus, the disclosed techniques for guaranteed consistent overhead insertion can be implemented in any type of communication system which utilizes overhead insertion in its framing operations.

Alternative embodiments of the present invention may be configured to provide monitoring of non-consecutive TOH bytes or other blocks of overhead information, in place of or in conjunction with the above-noted consistent insertion of overhead information.

In accordance with one aspect, a mapper or other communication device comprises a signal combiner, first storage elements, second storage elements and a controller. The signal combiner is configured to combine overhead information with additional information in forming a frame of a synchronous transport signal or other type of signal. The first storage elements are adapted to receive respective portions of a given block of the overhead information to be applied to the signal combiner, and the second storage elements are coupled between respective ones of the first storage elements and respective inputs of the signal combiner. The controller is operative to monitor a count of portions of the frame as the frame is formed by the signal combiner and to control loading of the portions of the given block of the overhead information into the second storage elements from the first storage elements responsive to the monitored count.

The portions of the given block of the overhead information may comprise respective bytes of an extended word of the overhead information, and more specifically respective TOH bytes of an extended TOH word.

The first storage elements may comprise respective first registers for storing the respective bytes of the extended word as written thereto by an associated host processor. The second storage elements may comprise respective second registers for storing the respective bytes of the extended word responsive to a load enable signal generated by the controller based at least in part on the monitored count having a particular characteristic.

The signal combiner may comprise a multiplexer having inputs coupled to respective outputs of the second storage elements and one or more additional inputs each adapted to receive at least a portion of the additional information.

The controller may comprise a counter operative to provide the count of the portions of the frame as the frame is formed by the signal combiner. The controller may be configured to control loading of the portions of the given block of the overhead information from the respective first storage elements into the respective second elements responsive to an output of the counter having a value that falls outside of a designated range. The designated range may be defined by a first counter value associated with an initial byte of a particular extended word of the overhead information and a second counter value associated with a final byte of the particular extended word of the overhead information.

In one of the illustrative embodiments, the controller comprises a comparator having a first input adapted to receive an output of the counter, second and third inputs adapted to receive respective counter values defining a designated range of counter values, and an output indicative of whether or not the output of the counter falls within the designated range.

The controller in this embodiment further comprises a latch circuit having an input adapted to receive a signal indicative of availability of the portions of the given block of overhead information in the respective first storage elements, and a logic circuit having a first input coupled to an output of the latch circuit and a second input coupled to an output of the comparator. An output of the logic circuit is coupled to a load enable input of the second storage elements and to a reset input of the latch circuit.

The illustrative embodiments of the invention provide a number of significant advantages over the conventional techniques previously described. For example, by configuring a mapper or other device of a network-based communication system to perform TOH byte insertion with guaranteed consistency for synchronous transport signals, extended TOH words of various lengths can be used without reservation for control, status and other functions, thereby increasing flexibility and improving throughput performance of the system.

DETAILED DESCRIPTION OF THE INVENTION

The invention will be illustrated herein in conjunction with an exemplary network-based communication system which includes a physical layer device, a link layer device and other elements configured in a particular manner. It should be understood, however, that the invention is more generally applicable to any communication system application in which it is desirable to provide enhanced efficiency and flexibility in processing of overhead information.

Figure 1:
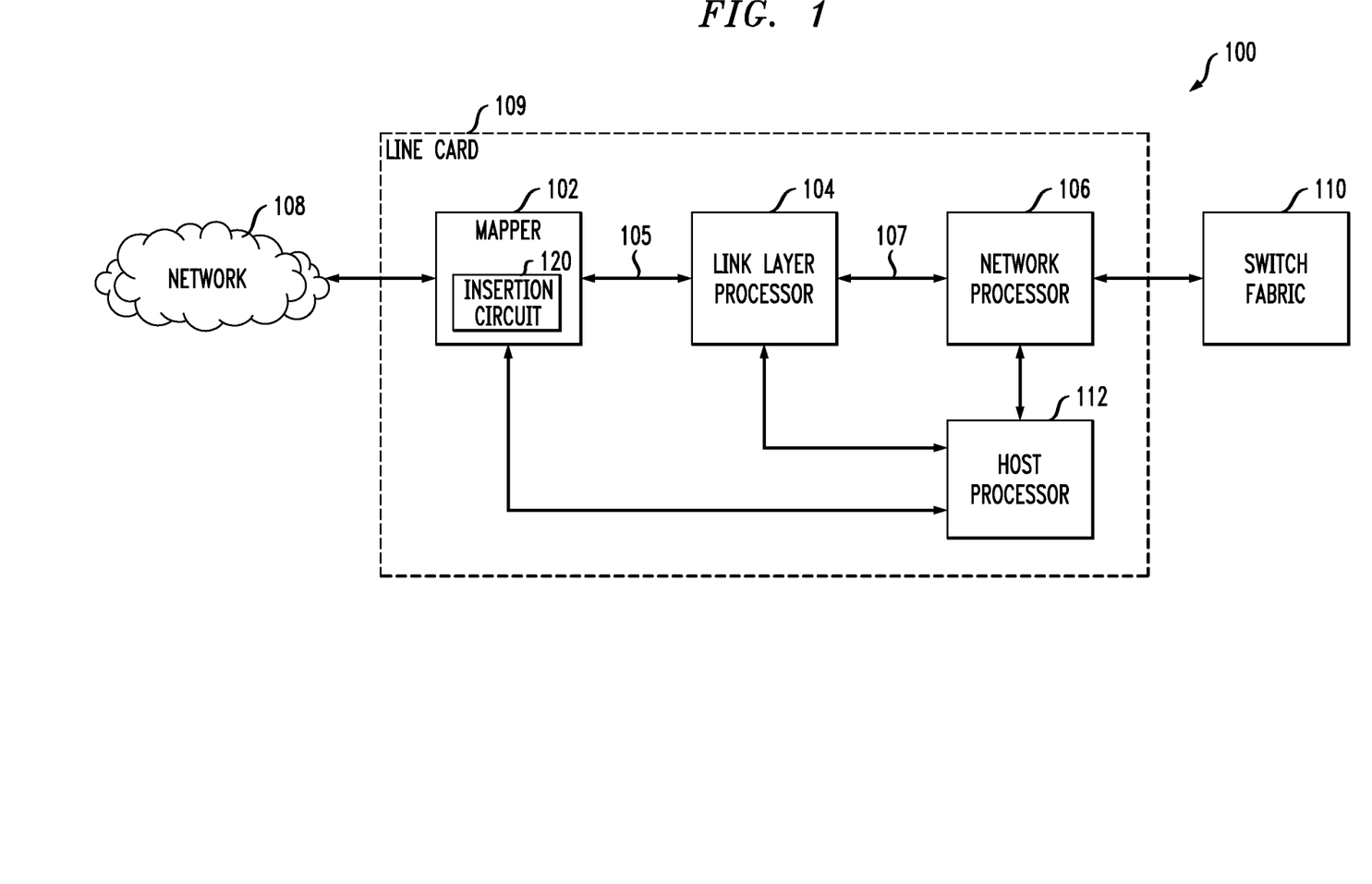
FIG. 1 is a block diagram of a network-based communication system comprising a mapper having an overhead insertion circuit in an illustrative embodiment.

FIG. 1 shows a network-based communication system 100 in an illustrative embodiment of the invention. The system 100 includes a mapper 102 coupled to a link layer processor 104 via an interface 105. The mapper 102 is a physical layer device suitable for providing access termination and aggregation for multiple services. One or more additional physical layer devices may be utilized in conjunction with the mapper 102, but such devices are not explicitly shown in the figure for clarity and simplicity of illustration. The link layer processor 104 is also coupled to a network processor 106, via an interface 107. The mapper 102 in this embodiment is coupled to a network 108. Examples of other types of physical layer devices that may be incorporated into the system 100 include an optical transceiver for interfacing the mapper with an optical transmission medium of the network 108.

The link layer processor 104 is an example of what is more generally referred to herein as a "link layer device." Such a device is intended to be broadly construed to encompass any type of processor which performs processing operations associated with a link layer of a network-based system. The term "physical layer device" as used herein is intended to encompass a device which provides an interface between a link layer device and a physical transmission medium of a network-based system.

The mapper 102 performs signal mapping functions on SONET/SDH signals of a type generally known in the art. For example, network 108 may comprise routers, switches or other network elements of a SONET/SDH network operating as described in the above-cited SONET/SDH standards documents. It should be noted that the term "SONET/SDH" as used herein refers to SONET and/or SDH. The mapper 102 may provide an interface between such SONET/SDH network elements and other system elements, such as plesiochronous digital hierarchy (PDH) elements that process DS1/E1 and/or DS3/E3 signals.

The mapper 102 and link layer processor 104 may include additional functionality of a conventional type. Such additional functionality, being well known to those skilled in the art, will not be described in detail herein, but may include functionality associated with known mappers, such as the LSI Hypermapper™, Ultramapper™ and Supermapper™ devices, and known link layer devices, such as the LSI Link Layer Processor. These LSI devices are commercially available from LSI Corporation of Milpitas, Calif., U.S.A. The network processor 106 may comprise, for example, a conventional network processor such as an LSI Advanced Payload-Plus® network processor in the APP300, APP500 or APP650 product family, also commercially available from LSI Corporation.

Additional details regarding conventional aspects of a SONET/SDH mapper can be found in, for example, TMXF84622 Ultramapper™ 622/155 Mbits/s SONET/SDH x DS3/E3/DS2/DS1/E1/DS0, Ultramapper™ Resource Document, Jun. 6, 2002, which is incorporated by reference herein.

Although only a single mapper 102 is shown in the FIG. 1 embodiment, other embodiments may comprise multiple mappers. For example, a group of multiple mappers may be arranged in a master-slave configuration that includes at least one master mapper and a plurality of slave mappers. Other embodiments may include only a single slave mapper, rather than multiple slave mappers. Numerous alternative configurations of multiple mappers are also possible, as will be appreciated by those skilled in the art.

The mapper 102, link layer processor 104, and network processor 106 in this illustrative embodiment are installed on a line card 109 of the system 100. The line card 109 is coupled between network 108 and a switch fabric 110 of the system 100 as shown. The link layer processor 104 and network processor 106 are configured to communicate packets, cells or other protocol data units (PDUs) between the network 108 and the switch fabric 110 which controls switching of PDU data. As indicated previously, the mapper 102 serves to interface the link layer processor 104 to physical transmission media of the network 108, which may comprise optical fiber links or any other type of transmission media.

Also installed on the line card 109 is a host processor 112. This processor is used to configure and control one or more of the other processing elements of the line card, such as the mapper 102, link layer processor 104 and network processor 106. As a more particular example, a given such host processor utilized to configure and control both the mapper 102 and the link layer processor 104 is referred to herein as a microprocessor unit (MPU). Portions of the host processor functionality may be incorporated into one or more of elements 102, 104 or 106 in alternative embodiments of the invention. In the present embodiment, the mapper 102 comprises an overhead insertion circuit 120 that provides guaranteed consistency between multiple TOH bytes of an extended TOH word inserted within a given SONET/SDH frame. The operation of the insertion circuit 120 will be described in greater detail below with reference to FIGS. 2 and 3.

Various elements of the system 100 may be implemented, by way of example and without limitation, utilizing a microprocessor, central processing unit (CPU), digital signal processor (DSP), ASIC, FPGA, or other type of data processing device, as well as portions or combinations of these and other devices. Each of the devices 102, 104, 106 and 112 may therefore be implemented as a separate integrated circuit or alternatively multiple such devices may be combined into a single integrated circuit.

It should be noted that the line card configuration shown in FIG. 1 is merely one example of a possible system configuration. Other embodiments can be implemented using a wide variety of other types of structural arrangements that do not involve line cards. The elements 102, 104, 106, 109, 110 and 112 in this example may be viewed as being part of a particular node of network 108 that operates in accordance with the SONET/SDH standards. Other nodes of the network 108 may of course be configured in a similar manner.

The interface 105 between the mapper 102 and the link layer processor 104 may comprise a conventional interface over which signals are transmitted from a mapper to a link layer processor, and over which signals are received by a mapper from a link layer processor.

The mapper 102 may be equipped with payload extraction and insertion functionality, such that SONET/SDH payloads can be communicated between the mapper and the link layer device. See U.S. patent application Ser. No. 11/839,971, filed Aug. 16, 2007 and entitled "Synchronous Transport Signal Mapper with Payload Extraction and Insertion Functionality," which is commonly assigned herewith and incorporated by reference herein.

The mapper 102 may also or alternatively be configured to support 1+1 protection switching. For example, the mapper may comprise a working device and a protection device, with in-band communication of alarm status information or other types of information between the protection device and the working device. Such arrangements are described in U.S. patent application Ser. No. 11/935,533, filed Nov. 6, 2007 and entitled "In-Band Communication of Alarm Status Information in a Synchronous Transport Communication System," which is commonly assigned herewith and incorporated by reference herein.

The interface 107 between the link layer processor 104 and the network processor 106 may be, for example, a conventional interface such as a SPI-3 interface as described in Implementation Agreement OIF-SPI3-01.0"System Packet Interface Level 3 (SPI-3): OC-48 System Interface for Physical and Link Layer Devices," Optical Internetworking Forum, 2001, which is incorporated by reference herein. Other types of known interfaces, such as POS-2, may also be used.

Although the link layer processor 104 and network processor 106 are shown as separate elements in this illustrative embodiment, other embodiments may combine the functionality of the link layer processor and the network processor into a single link layer device. The general term "link layer device" as used herein is thus intended to encompass devices which incorporate at least a portion of the functionality commonly associated with a network processor.

For example, a given link layer device may be configured to provide flow control, traffic shaping and other functions. It may include an internal memory, as well as an interface to an external memory. Such memory elements may be utilized for implementing PDU buffer memory, queuing and dispatch buffer memory, etc. The link layer device may further include one or more memory controllers, as well as appropriate interface circuitry for interfacing with the mapper 102 or other physical layer device(s), the switch fabric 110, and other external devices, such as the host processor 112, which may be configured to communicate with the link layer device over a standard bus architecture, e.g., a peripheral component interconnect (PCI) bus. The link layer device may also include a scheduler, queuing and dispatch logic, as well as other conventional elements not explicitly shown in the figure. The operation of these and other conventional elements, being well understood by those skilled in the art, is not described in detail herein.

Numerous alternative interfacing arrangements are possible. It is also possible that, in other embodiments, a given link layer device may be combined with one or more physical layer devices into a single device. Thus the mapper 102 and any associated physical layer device(s) need not be physically separate from the link layer processor 104 as in the FIG. 1 embodiment, but such elements could instead be combined into a single integrated circuit or other type of processing device.

It may be assumed with reference to the system 100 of FIG. 1 that an "ingress" direction refers to a direction of data transfer from the network 108 to the switch fabric 110. Similarly, it may be assumed that an "egress" direction refers to a direction of data transfer from the switch fabric 110 to the network 108. It should be understood that these and other assumptions made herein are for clarity and simplicity of description only, and should not be construed as limitations of the invention. The terms "ingress" and "egress" thus do not refer to particular fixed directions, but instead may be viewed as arbitrary input and output data flow directions in a particular system implementation.

It should also be noted that the particular arrangement of system elements shown in FIG. 1 is by way of illustrative example only. More particularly, a mapper with guaranteed consistent overhead insertion as disclosed herein can be implemented in any type of communication system which utilizes overhead insertion in its framing operations. The system 100 may include other elements in addition to or in place of those specifically shown, including one or more elements of a type commonly found in a conventional implementation of such a system.

As indicated previously herein, it is difficult to combine multiple TOH bytes to perform a given instance of a function such as network control or status reporting. This is because conventional practice does not provide a suitable mechanism for guaranteeing that the multiple TOH bytes will actually be inserted in a synchronous transport signal frame in the particular order required to perform the desired function. For example, in situations in which the multiple TOH bytes are written under the control of an element external to the mapper, such as the host processor 112 of the FIG. 1 system, the particular sequence in which the TOH bytes are inserted in the synchronous transport signal frame is not guaranteed.

By way of example, consider an arrangement in which the host processor 112 wants to transfer two 16-bit words using TOH bytes inserted in SONET/SDH frames. Assume the first word comprises bytes denoted as byte11 and byte12, and the second word comprises bytes denoted as byte21 and byte22. An appropriate way to perform this transfer is to insert byte 11 and byte 12 into respective D4 and D5 positions in a first frame, and to insert byte21 and byte22 into respective D4 and D5 positions in a second frame. However, under conventional practice, the host processor may direct the insertion of byte21 into D4 but there may be insufficient time to insert byte22 into D5 of the same frame such that the previous byte12 is again transmitted in D5 of that frame. As a result, the 16-bit word will comprise byte 21 followed by byte12, which would not provide the desired functionality. A similar example of this inconsistent ordering of multiple TOH bytes is illustrated in the second to last signal line of the timing diagram of FIG. 3.

The present embodiment overcomes this problem by providing the mapper 102 with overhead insertion circuit 120. This circuit is advantageously configured to provide guaranteed consistency between multiple TOH bytes of an extended word inserted within a given frame of a synchronous transport signal. The term "extended word" in this context refers to a set of multiple TOH bytes that are utilized to perform a given instance of a particular function such as network control or status reporting. The above-described lack of guaranteed consistency between multiple TOH bytes has prevented the use of such extended TOH words in conventional systems. Embodiments of the present invention provide guaranteed consistency among multiple TOH bytes inserted in a synchronous transport signal frame, and thus allow extended TOH words to be used as needed for network control, status reporting, and other functions. This considerably improves system flexibility and performance.

Figure 2:
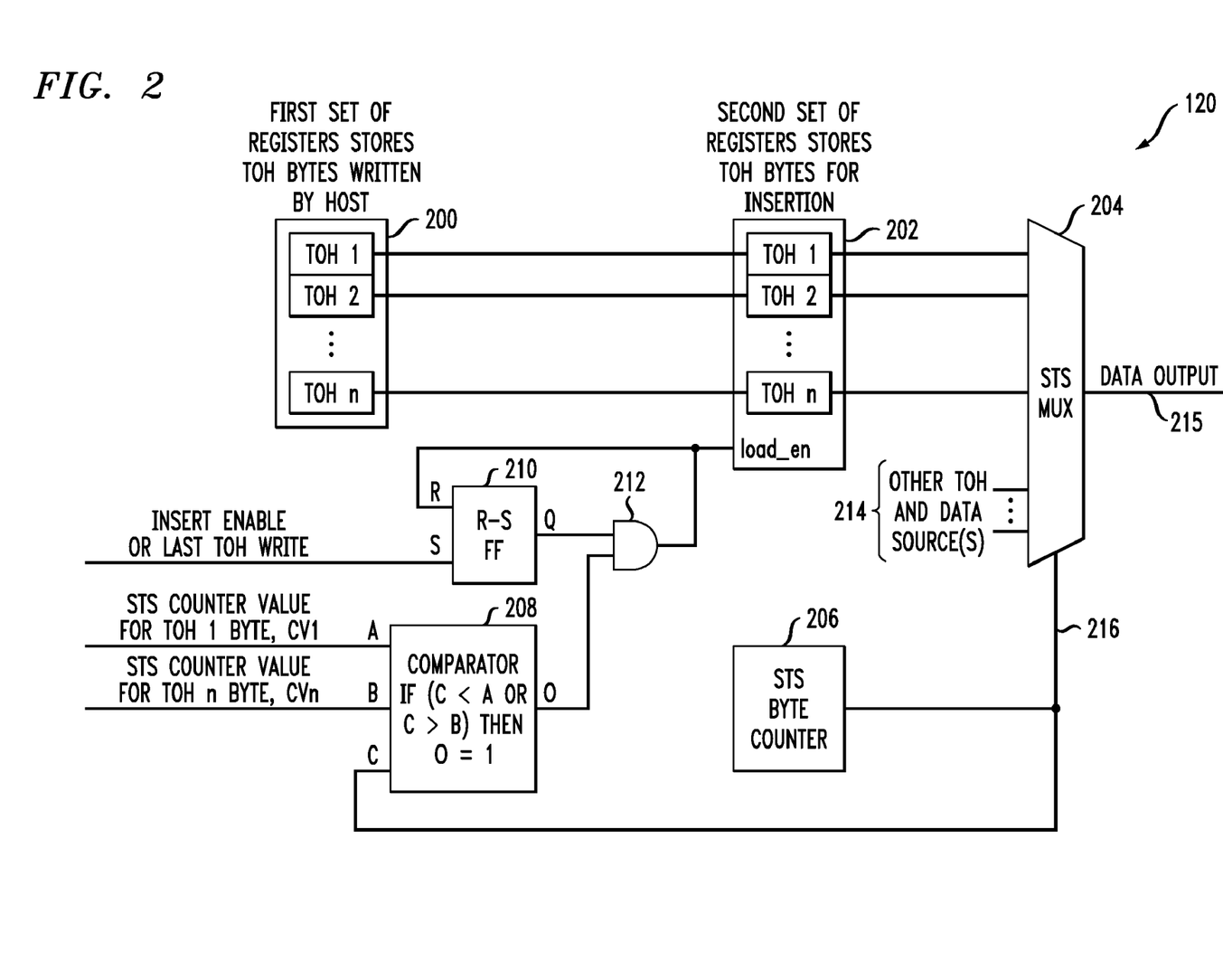
FIG. 2 is a more detailed view of the exemplary overhead insertion circuit implemented in the mapper of the FIG. 1 system.

FIG. 2 shows a more detailed view of the overhead insertion circuit 120 of the mapper 102 in one embodiment. The insertion circuit comprises a first set of registers 200, a second set of registers 202, and a multiplexer 204. The insertion set of registers further comprises an STS byte counter 206, a comparator 208, an R-S flip-flop 210, and an AND gate 212.

In this embodiment, it is assumed without limitation that the overhead information to be inserted in synchronous transport signal frame comprises multiple TOH bytes of an extended TOH word. However, the disclosed techniques can be adapted in a straightforward manner to providing guaranteed consistent insertion of other types of overhead information. Generally, such overhead information may be viewed as comprising blocks each having multiple portions, with the disclosed techniques being used to provide guaranteed consistent insertion of the multiple portions of a given block within a frame of a synchronous transport signal. In the illustrative embodiment, the extended TOH word is an example of such a block, and the multiple bytes of the extended TOH word are examples of portions of that block.

The registers of the first set 200 are configured to store respective TOH bytes of the extended TOH word as written thereto by the host processor 112. There are a total of n TOH bytes in the extended TOH word in the present embodiment, denoted TOH 1, TOH 2, . . . TOH n. The registers of the second set 202 are configured to store respective TOH bytes of the extended TOH word that are substantially simultaneously loaded from the corresponding registers of the first set 200 in a manner that ensures their consistent insertion into the frame. This loading occurs responsive to a load enable signal load_en generated utilizing byte counter 206, comparator 208, latch 210 and logic gate 212 as will be described below.

Outputs of the registers of the second set 202 are coupled to respective inputs of the multiplexer 204. The multiplexer also includes a number of additional inputs 214 that may correspond to other overhead information including additional TOH words as well as data from one or more sources. The multiplexer combines the overheard information with the data to form one or more frames of a synchronous transport signal at its data output 215. It should be noted in this regard that the term "frame" as used herein is intended to be broadly construed, and should not be viewed as being limited to a synchronous transport signal frame.

The byte counter 206 is coupled to a control input 216 of the multiplexer 204 and is arranged to control the multiplexing of the overhead information with the data to form the frame of the synchronous transport signal. Each TOH byte generally corresponds to a unique value of the byte counter such that the multiplexer can output the correct TOH byte according to the value of the byte counter.

The comparator 208 monitors the output of the byte counter 206 as the frame is being formed by the multiplexer 204 to determine if the output of the counter has a value that falls outside of a designated range. The designated range in this embodiment is defined by a first counter value CV1 associated with an initial byte TOH 1 of the extended word of the overhead information and a second counter value CVn associated with a final byte TOH n of the extended word of the overhead information. The comparator has two inputs, denoted A and B, that are adapted to receive the respective counter values CV1 and CVn, and an additional input, denoted C, that is adapted to receive an output of the byte counter 206. The comparator also has an output, denoted O, indicative of whether or not the output of the byte counter falls within the designated range defined by the counter values CV1 and CVn. More specifically, the output O of the comparator is at a logic one level if C<A or C>B.

The output O of the comparator 208 is applied as an input to AND gate 212. The other input of the AND gate is a data output (Q) of the R-S flip-flop 210. The set input (S) of the R-S flip-flop is adapted to receive a signal indicative of availability of the n TOH bytes of the extended word in the respective registers of the first set 200. This signal may comprise, for example, an insert enable signal, such as a register bit that the host processor 112 can set or clear, or a pulse indicating that the last TOH byte of the extended word has been written to its corresponding register in the first set 200. It is assumed that when this insert enable or last TOH write signal applied to the S input transitions from a logic zero level to a logic one level, it sets the flip-flop 210 such that the Q output transitions from a logic zero level to a logic one level.

The output of the AND gate 212 is the above-noted load_en signal applied to the second set 202 in order to load the n TOH bytes from the respective registers of the first set 200 into the respective registers of the second set 202. The output of the AND gate is also fed back to the reset input (R) of the R-S flip-flop 210 as shown, in order to reset the flip-flop in conjunction with the loading of the n TOH bytes of the extended word into the registers of the second set of registers 202. The resetting of the flip-flop causes its Q output to return to the logic zero level.

The insertion circuit 120 as shown in FIG. 2 ensures that the second set of registers 202 is substantially simultaneously loaded with the entire extended TOH word at an appropriate time so as to permit guaranteed consistent insertion of all of the bytes of the extended word into the frame of the synchronous transport signal. Thus, the host processor 112 can write the TOH bytes of a given extended word to the first set of registers 200 without concern that these bytes may be inserted in a different sequence in the frame.

As an example of the operation of the insertion circuit 120, assume again that TOH 1 is the first byte of an extended word to be inserted into a given frame and TOH n is the last byte of the extended word to be inserted into the frame. As noted above, a first counter value CV1 is associated with TOH 1 and a second counter value CVn is associated with TOH n. Further assume that M1 represents the time at which TOH 1 is inserted, and Mn represents the time at which TOH n is inserted. If the time at which the second set of registers 202 is loaded responsive to assertion of the load_en signal does not fall into the window between M1 and Mn, all of the n TOH bytes in the extended word will be inserted in the same frame. The comparator 208 ensures that the value of the byte counter is outside of the range from CV1 to CVn when the load_en signal is asserted to load the n TOH bytes from the first set of registers 200 into the second set of registers 202, thereby ensuring that all n TOH bytes will be inserted in the same frame.

The registers of the first set 200 and the registers of the second set 202 may be viewed as examples of what are more generally referred to herein as "first storage elements" and "second storage elements," respectively. The multiplexer 204 may be viewed as an example of what is more generally referred to herein as a "signal combiner." The byte counter 206, comparator 208, latch 210 and logic gate 212 may be viewed as collectively comprising an example of what is more generally referred to herein as a "controller." Alternatively, the byte counter 206 may be viewed as part of the signal combiner rather than as part of the controller.

Generally, the first storage elements are adapted to receive respective portions of a given block of the overhead information to be applied to the signal combiner, and the second storage elements are coupled between respective ones of the first storage elements and respective inputs of the signal combiner. The signal combiner is configured to combine overhead information with additional information in forming a frame of a synchronous transport signal. The controller is operative to monitor a count of portions of the frame as the frame is formed by the signal combiner and to control loading of the portions of the given block of the overhead information into the second storage elements from the first storage elements responsive to the monitored count. It is to be appreciated that other embodiments of the invention may use different types and arrangements of storage elements, signal combiners and controllers to provide guaranteed consistency for multiple bytes or other portions of an extended word or other type of block to be inserted into a frame of a synchronous transport signal. For example, other types of latches and logic gates may be used in place of the R-S flip-flop 210 and the AND 212 gate in the FIG. 2 embodiment.

Figure 3:
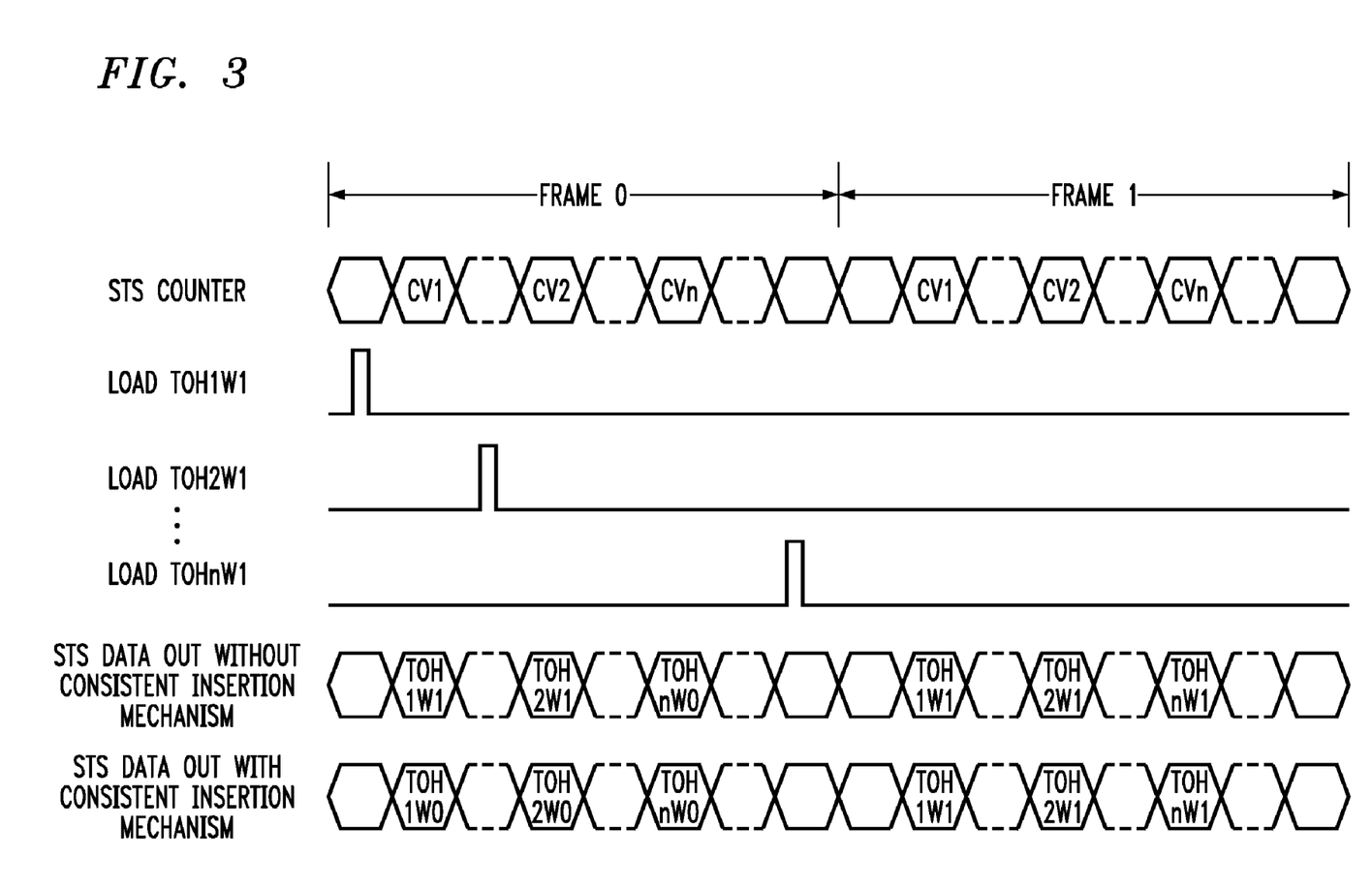
FIG. 3 is a timing diagram illustrating the operation of the exemplary overhead insertion circuit of FIG. 2.

Referring now to FIG. 3, a timing diagram is shown that illustrates the operation of the FIG. 2 insertion circuit 120 in greater detail. The signal at the top of the diagram shows the output of the STS byte counter 206 for two frames denoted Frame 0 and Frame 1. In each frame, the byte counter counts include CV1, CV2, ... CVn. Assume that a first n-byte extended TOH word W0 includes TOH bytes TOH1W0, TOH2W0, ... TOHnW0, and a second n-byte extended TOH word W1 includes TOH bytes TOH1W1, TOH2W1, ... TOHnW1. The diagram also shows load signals for respective ones of the TOH bytes of W1, that is, for TOH1W1, TOH2W1, ... TOHnW1, and the STS data output of the multiplexer 215. The STS data is shown with and without use of the consistent insertion mechanism of FIG. 2.

For the case in which the consistent insertion mechanism of FIG. 2 is used, the load signals for the respective ones of the TOH bytes of W1 include pulses that are assumed to indicate when the respective bytes are written to the respective registers in the first set of registers 200 by the host processor 112. It is assumed that similar pulses are used to load the TOH bytes of W0 prior to their insertion into an STS frame.

For the case in which the consistent insertion mechanism of FIG. 2 is not used, the load pulses are assumed to indicate availability of the corresponding TOH bytes for insertion into an STS frame.

Alternative embodiments may utilize write or update signals in place of the load signals used in the example of FIG. 2.

From this example, it can be seen that the load pulses for TOH bytes TOH1W1 and TOH2W1 precede the corresponding counts CV1 and CV2 in the STS byte counter. However, the load pulse for the TOH byte TOHnW1 arrives too late, that is, after the occurrence of the corresponding count CVn in the STS byte counter. Accordingly, if the consistent insertion mechanism of FIG. 2 is not used, the TOH byte TOHnW0 for the previous word will be inserted in the position in the sequence where the TOH byte TOHnW1 should be inserted. This will cause the sequence of TOH bytes in Frame 0 to be inconsistent with the desired ordering. Such a problem is prevented by the use of the consistent insertion mechanism of FIG. 2.

When this mechanism is used, it does not matter that the load pulse for the TOH byte TOHnW1 arrives too late, since the circuit 120 is configured to ensure that all of the TOH bytes of a given extended word are loaded into the second set of registers 202 at an appropriate time so as to permit their consistent insertion into a single frame. Thus, none of the TOH bytes of word W1 are inserted into Frame 0, because the load pulse for one of them arrived too late to allow a consistent sequence to be maintained upon insertion into that frame. Instead, the TOH bytes of word W0 are inserted in a consistent sequence in Frame 0, and the TOH bytes of word W1 are inserted in a consistent sequence in Frame 1.

The illustrative embodiments allow n-byte extended words to be used for control, status and other functions in a network-based communication system, thereby improving system flexibility and performance.

Other embodiments of the present invention may be configured to provide monitoring of non-consecutive TOH bytes or other blocks of overhead information.

Although described primarily in the context of TOH byte insertion in synchronous transport signals, the disclosed techniques can be adapted in a straightforward manner for use with a wide variety of other types of signals, including, by way of example, signals comprising packet data, such as ATM signals and pseudo-wire emulation (PWE) signals, as well as PDH signals. More generally, the disclosed techniques can be applied to any signal structure that includes overhead information that must be inserted in a consistent manner. As mentioned previously, the term "frame" as used herein is intended to be broadly construed, so as to encompass the above-noted packet formats or other signal structures that require consistent insertion of overhead information.

It should be noted that the controller comprising elements 208, 210 and 212 of FIG. 2, and possibly other components of the insertion circuit 120, may be implemented at least in part in the form of one or more software programs running on a general-purpose processor. For example, a memory associated with the mapper 102 or host processor 112 may be used to store executable program code of this type. Such a memory is an example of what is more generally referred to herein as a "computer program product" having executable computer program code embodied therein. The computer program code when executed in a mapper or other communication device causes the device to perform operations for ensuring consistent insertion of multiple bytes of an extended word of overhead information into a frame of a synchronous transport signal. Other examples of computer program products embodying aspects of the invention may include, for example, optical or magnetic disks.

Also, a mapper or other communication device in accordance with the invention may be implemented as an integrated circuit device suitable for installation on a line card or port card of a router or switch. Numerous other configurations are possible.

In a given integrated circuit implementation, identical die are typically formed in a repeated pattern on a surface of a semiconductor wafer. Each die includes a mapper, link layer processor or other device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the embodiments of the invention as described herein are intended to be illustrative only. For example, the particular arrangement of physical layer device, link layer device, network processor and other elements as shown in FIG. 1 may be varied in alternative embodiments. Also, the particular signals shown in the drawings and described above are presented by way of example, and those skilled in the art will recognize that alternative signal configurations and associated timing arrangements may be used. Furthermore, other types of circuitry may be used to implement consistent overhead insertion operations as disclosed herein. These and numerous other alternative embodiments within the scope of the following claims will be readily apparent to those skilled in the art.

What is claimed is:

1. An apparatus comprising:
   a signal combiner configured to combine overhead information with additional information in forming a frame of a signal;
   first storage elements adapted to receive respective portions of a given block of the overhead information to be applied to the signal combiner;
   second storage elements coupled between respective ones of the first storage elements and respective inputs of the signal combiner; and
   a controller operative to monitor a value counting portions of the frame as said frame is formed by the signal combiner and to control loading of the portions of the given block of the overhead information into the second storage elements from the first storage elements responsive to the monitored count value;
   wherein each of the second storage elements corresponds to a different one of the first storage elements.

2. The apparatus of claim 1 wherein the portions of the given block of the overhead information comprise respective bytes of an extended word of the overhead information.

3. The apparatus of claim 2 wherein said first storage elements comprise respective first registers for storing the respective bytes of the extended word as written thereto by an associated host processor.

4. The apparatus of claim 2 wherein said second storage elements comprise respective second registers for storing the respective bytes of the extended word responsive to a load enable signal generated by the controller based at least in part on said monitored count value having a particular characteristic.

5. The apparatus of claim 1 wherein the signal combiner comprises a multiplexer having inputs coupled to respective outputs of the second storage elements and one or more additional inputs each adapted to receive at least a portion of said additional information.

6. The apparatus of claim 1 wherein the controller comprises a counter operative to provide said value counting the portions of the frame as said frame is formed by the signal combiner.

7. The apparatus of claim 6 wherein the controller is configured to control loading of the portions of the given block of the overhead information from the respective first storage elements into the respective second elements responsive to an output of the counter having a value that falls outside of a designated range.

8. An integrated circuit comprising the apparatus of claim 1.

9. A communication device comprising the apparatus of claim 1.

10. An apparatus comprising:
    a signal combiner configured to combine overhead information with additional information in forming a frame of a signal;
    first storage elements adapted to receive respective portions of a given block of the overhead information to be applied to the signal combiner;
    second storage elements coupled between respective ones of the first storage elements and respective inputs of the signal combiner; and
    a controller operative to monitor a value counting portions of the frame as said frame is formed by the signal combiner and to control loading of the portions of the given block of the overhead information into the second storage elements from the first storage elements responsive to the monitored count value;

wherein the overhead information comprises transport overhead (TOH) information of a synchronous transport signal.

11. An apparatus comprising:

a signal combiner configured to combine overhead information with additional information in forming a frame of a signal;

first storage elements adapted to receive respective portions of a given block of the overhead information to be applied to the signal combiner;

second storage elements coupled between respective ones of the first storage elements and respective inputs of the signal combiner; and a controller, operative to monitor a value counting portions of the frame as said frame is formed by the signal combiner and to control loading of the portions of the given block of the overhead information into the second storage elements from the first storage elements responsive to the monitored count value, comprising a counter operative to provide said value counting the portions of the frame as said frame is formed by the signal combiner;

wherein the controller is configured to control loading of the portions of the given block of the overhead information from the respective first storage elements into the respective second elements responsive to an output of the counter having a value that falls outside of a designated range;

wherein the designated range is defined by a first counter value associated with an initial byte of a particular extended word of the overhead information and a second counter value associated with a final byte of the particular extended word of the overhead information.

12. An apparatus comprising:

a signal combiner configured to combine overhead information with additional information in forming a frame of a signal;

first storage elements adapted to receive respective portions of a given block of the overhead information to be applied to the signal combiner;

second storage elements coupled between respective ones of the first storage elements and respective inputs of the signal combiner; and a controller, operative to monitor a value counting portions of the frame as said frame is formed by the signal combiner and to control loading of the portions of the given block of the overhead information into the second storage elements from the first storage elements responsive to the monitored count value, comprising:

a counter operative to provide said value counting the portions of the frame as said frame is formed by the signal combiner; and a comparator having a first input adapted to receive an output of the counter, second and third inputs adapted to receive respective counter values defining a designated range of counter values, and an output indicative of whether or not the output of the counter falls within the designated range;

wherein the controller is configured to control loading of the portions of the given block of the overhead information from the respective first storage elements into the respective second elements responsive to an output of the counter having a value that falls outside of a designated range.

13. The apparatus of claim 12 wherein the controller further comprises:

a latch circuit having an input adapted to receive a signal indicative of availability of the portions of the given block of overhead information in the respective first storage elements; and a logic circuit having a first input coupled to an output of the latch circuit and a second input coupled to an output of the comparator;

wherein an output of the logic circuit is coupled to a load enable input of the second storage elements and to a reset input of the latch circuit.

14. A node of a network-based communication system, said node comprising:

a physical layer device; and a link layer device coupled to the physical layer device;

wherein the physical layer device comprises:

a signal combiner configured to combine overhead information with additional information in forming a frame of a signal;

first storage elements adapted to receive respective portions of a given block of the overhead information to be applied to the signal combiner;

second storage elements coupled between respective ones of the first storage elements and respective inputs of the signal combiner; and a controller operative to monitor a value counting portions of the frame as said frame is formed by the signal combiner and to control loading of the portions of the given block of the overhead information into the second storage elements from the first storage elements responsive to the monitored count value;

wherein each of the second storage elements corresponds to a different one of the first storage elements.

15. The node of claim 14 wherein said physical layer and link layer devices comprise respective integrated circuits.

16. The node of claim 14 wherein the physical layer device comprises a mapper integrated circuit.

17. A network-based communication system comprising:

a plurality of interconnected nodes;

wherein at least a given one of said nodes comprises:

a signal combiner configured to combine overhead information with additional information in forming a frame of a signal;

first storage elements adapted to receive respective portions of a given block of the overhead information to be applied to the signal combiner;

second storage elements coupled between respective ones of the first storage elements and respective inputs of the signal combiner; and a controller operative to monitor a value counting portions of the frame as said frame is formed by the signal combiner and to control loading of the portions of the given block of the overhead information into the second storage elements from the first storage elements responsive to the monitored count value;

wherein each of the second storage elements corresponds to a different one of the first storage elements.

18. A method comprising the steps of:

combining overhead information with additional information to form a frame of a signal; and outputting the frame of the signal;

wherein respective portions of a given block of the overhead information to be processed in the combining step are loaded from respective first storage elements into respective second storage elements coupled between respective ones of the first storage elements and respective inputs of a signal combiner responsive to a monitored value counting portions of the frame as said frame is formed in the combining step;

wherein each of the second storage elements corresponds to a different one of the first storage elements.

19. The method of claim 18 wherein the portions of the given block of the overhead information comprise respective bytes of an extended word of the overhead information.

20. A non-transitory computer readable medium having executable computer program code embodied therein, wherein the computer program code when executed in a communication device causes the device to perform the steps of the method of claim 18.

21. An apparatus comprising:
a signal combiner configured to combine overhead information with additional information in forming a frame of a signal;
first storage elements adapted to receive respective portions of a given block of the overhead information to be applied to the signal combiner;
second storage elements coupled between respective ones of the first storage elements and respective inputs of the signal combiner; and
a controller operative to monitor a value counting portions of the frame as said frame is formed by the signal combiner and to control loading of the portions of the given block of the overhead information into the second storage elements from the first storage elements responsive to the monitored count value;
wherein the loading responsive to the monitored count value comprises substantially simultaneous loading of the plurality of portions of the given block of the overhead information into the plurality of second storage elements from the plurality of first storage elements.

* * * * *